Patented Jan. 27, 1931

1,790,510

UNITED STATES PATENT OFFICE

JOHN WESLEY ORELUP, OF EAST ORANGE, NEW JERSEY

PROCESS FOR PRODUCTION OF DIHYDROXYANTHRAQUINONE AND ITS DERIVATIVES

No Drawing.   Application filed June 8, 1926.   Serial No. 114,547.

This invention relates to a process for the production of dihydroxyanthraquinone, 1:4 chlorhydroxyanthraquinone and bromhydroxyanthraquinone, and more particularly to methods by which these products may be obtained more cheaply and more directly than by methods heretofore known and used.

These products have heretofore been commonly produced by the condensation of parachlorphenol, or its sulphonic acid derivatives, with phthalic anhydride. As it has commonly been considered heretofore that only the parachlorphenol can be used for this condensation and as both the orthochlorphenol and parachlorphenol are formed in the direct chlorination of phenol, a costly and tedious process for separating out the parachlorphenol was required before the chlorphenols could be used in this condensation. Moreover, in the former processes, a relatively large quantity of phthalic anhydride was required.

An object of my present invention is to provide a process for forming dihydroxyanthraquinone and its derivatives directly from the products resulting from the treatment of phenol with chlorine or other halogens, and without the necessity of this intermediate separation.

Another object of the invention is to provide a process for producing dihydroxyanthraquinone and its derivatives from orthochlorphenol or equivalent halogen phenol compounds.

A still further object of the invention is to provide a process for forming dihydroxyanthraquinone from phenol chlorination products in which the quantity of phthalic anhydride may be considerably reduced from that heretofore required.

In my present invention I may use orthochlorphenol or a mixture of orthochlorphenol and parachlorphenol with phthalic anhydride in a sulphuric acid solution containing boric acid as a condensing agent. Other similar halogen compounds of phenol may, of course, be used in place of the chlorphenol as, for example, the bromphenol, but ordinarily only the chlorine or bromine products would be used.

In carrying out the process, the chlorphenols may be first sulphonated to the mono or disulphonic acids and then condensed with phthalic anhydride, or they may be sulphonated in the condensation mixture. The dichlorphenol or dibromphenols may be used in place of the corresponding monochlor or bromphenols, but in this case the higher chlor or brom hydroxyanthraquinones are obtained.

Heretofore the theory relative to this condensation has been that the production of the dihydroxyanthraquinone proceeded directly in one step from the intermediate benzoyl benzoic acid compound formed during the reaction, but I am of the opinion that the hydroxychloranthraquinone or hydroxybromanthraquinone is first formed and then later breaks down into dihydroxyanthraquinone. In fact, varying proportions of hydroxychloranthraquinone, or the corresponding hydroxybromanthraquinone, and dihydroxyanthraquinone may be obtained by varying the time of reaction.

The proportions of the phenol halogen compound relative to the quantity of phthalic anhydride and to the sulphuric and boric acids may be varied somewhat, the quantity of phthalic anhydride, however, being in general much smaller in proportion to the phenol halogen substitution products than in the older methods in which only the parachlorphenol is used.

The following are given as typical examples of the proportions and conditions suitable for carrying on the process.

Example 1

A mixture, containing:

500 lbs. orthochlorphenol, 300 lbs. boric acid, 350 lbs. phthalic anhydride, 1500 lbs. 20% oleum, 1000 lbs. sulphuric acid 66° Bé., is heated at 150° to 160° C. for three hours, and is then heated at 170° to 200° C. for ten hours. The reaction mixture is then poured into a large amount of water and the hydroxychlor- and dihydroxyanthraquinone which is precipitated in this water is filtered out and subsequently purified by boiling with water and treating with caustic soda, sodium carbonate or bicarbonate.

*Example 2*

A mixture, containing:

500 lbs. mixed orthochlor- and parachlorphenol, 300 lbs. boric acid, 400 lbs. phthalic anhydride, 2000 lbs. 20% oleum, 500 lbs. sulphuric acid 66° Bé., is heated, as in Example 1, at 150° to 160° C. for three hours and then at 170° to 200° C. for ten hours, and the resulting product purified as in Example 1.

*Example 3*

A mixture, containing:

500 lbs. bromphenol (ortho and para mixture), 350 lbs. boric acid, 350 lbs. phthalic anhydride, 1750 lbs. 20% oleum, 750 lbs. sulphuric 66° Bé., is heated for three hours at 150° to 160° C. and then for ten hours at 170° to 200° C. The reaction mixture is then poured into water and the products purified as in Example 1.

While the proportions set forth in the above examples are suitable and are recommended in carrying on the process, still these proportions may be varied somewhat, as will be readily apparent, without departing from the broader features of the invention.

As changes in proportion and manipulation may be made within the scope of my invention, it is intended that all matter contained in the above description shall be interpreted as illustrative and not in a limiting sense.

Having described my invention, what I claim as new and desire to secure by Letters Patent is:

1. A process for the production of dihydroxyanthraquinone and its derivatives, which comprises heating mixed orthochlorphenol and parachlorphenol with phthalic anhydride in concentrated sulphuric acid in the presence of boric acid.

2. A process for the production of dihydroxyanthraquinone and its derivatives, which comprises heating mixed ortho and para halogen derivatives of phenol with phthalic anhydride in concentrated sulphuric acid in the presence of boric acid.

3. A process for the production of dihydroxyanthraquinone and its derivatives, which comprises heating a mixture of orthochlorphenol and phthalic anhydride in concentrated sulphuric acid in the presence of boric acid.

4. A process for the production of dihydroxyanthraquinone and of hydroxyhalogenanthraquinone, which comprises heating a mixture of ortho and para halogen phenols with phthalic anhydride in concentrated sulphuric acid in the presence of boric acid.

5. A process for the production of dihydroxyanthraquinone and its derivatives, which comprises heating a mixture of orthochlorphenol with phthalic anhydride in concentrated sulphuric acid in the presence of boric acid.

6. A process of making dihydroxyanthraquinone and its derivatives, which comprises heating chlorphenols with phthalic anhydride in concentrated sulphuric acid in the presence of boric acid, the part by weight of phthalic anhydride being less than that of the chlorphenol.

7. A process for producing dihydroxyanthraquinone and its derivatives, which comprises heating a phenol halogen compound with phthalic anhydride in concentrated sulphuric acid in the presence of boric acid, the part by weight of phthalic anhydride being less than that of the halogen phenol compound.

8. A process for producing dihydroxyanthraquinone and its derivatives, which comprises heating a mixture of orthochlorphenol and parachlorphenol with phthalic anhydride in concentrated sulphuric acid in the presence of boric acid, the part by weight of phthalic acid being less than that of said chlor phenols.

9. A process of producing dihydroxyanthraquinone and its derivatives, which comprises heating 500 parts by weight of monochlor phenol with approximately 350 to 400 parts by weight of phthalic anhydride, 1500 to 2000 parts of 20% oleum, 500 to 1000 parts of 66% Bé. sulphuric acid, and 300 parts of boric acid at temperatures between 150°–200° C.

In testimony whereof, I affix my signature.

JOHN WESLEY ORELUP.